United States Patent [19]
Cordeiro et al.

[11] Patent Number: 5,963,008
[45] Date of Patent: Oct. 5, 1999

[54] METHOD AND APPARATUS FOR ELECTROACOUSTIC BATTERY SONICATION

[76] Inventors: Jerome N. Cordeiro, 4324 Fern Valley Rd., Medford, Oreg. 97504; Gerard T. Jilek, 775 Oak Knoll Dr., Ashland, Oreg. 97520

[21] Appl. No.: 08/827,320

[22] Filed: Mar. 26, 1997

[51] Int. Cl.$^6$ .................................................. H01J 7/00
[52] U.S. Cl. ................................................ 320/100; 429/52
[58] Field of Search ............................... 320/106, 109, 320/112, 128, 136; 429/49–52, 66, 67, 68

[56] References Cited

U.S. PATENT DOCUMENTS

| | | |
|---|---|---|
| 3,985,581 | 10/1976 | Stachurski et al. ................... 429/51 |
| 4,871,959 | 10/1989 | Gali . | |
| 5,063,341 | 11/1991 | Gali . | |
| 5,378,551 | 1/1995 | Meadows et al. .................. 429/66 |
| 5,614,332 | 3/1997 | Pavelle et al. ..................... 429/68 |

*Primary Examiner*—Peter S. Wong
*Assistant Examiner*—Lawrence Luk
*Attorney, Agent, or Firm*—Keith A. Cushing

[57] ABSTRACT

Electroacoustic battery sonication rehabilitates a battery by decreasing metallic shorting across battery elements through sonication. Sonication may be produced by application of an electrical signal of selected frequency to the terminals of a battery, thereby establishing a resonant condition within the battery. Alternately, sonication may be provided by transducers placed within a battery and receiving a drive signal of selected frequency to establish a resonant condition within the battery. By removing metallic shorting, e.g., lead hydrates in the case of a lead acid battery, undesirable electrical conduction between battery plates diminishes and battery charging efficiency and capacity increase.

10 Claims, 2 Drawing Sheets

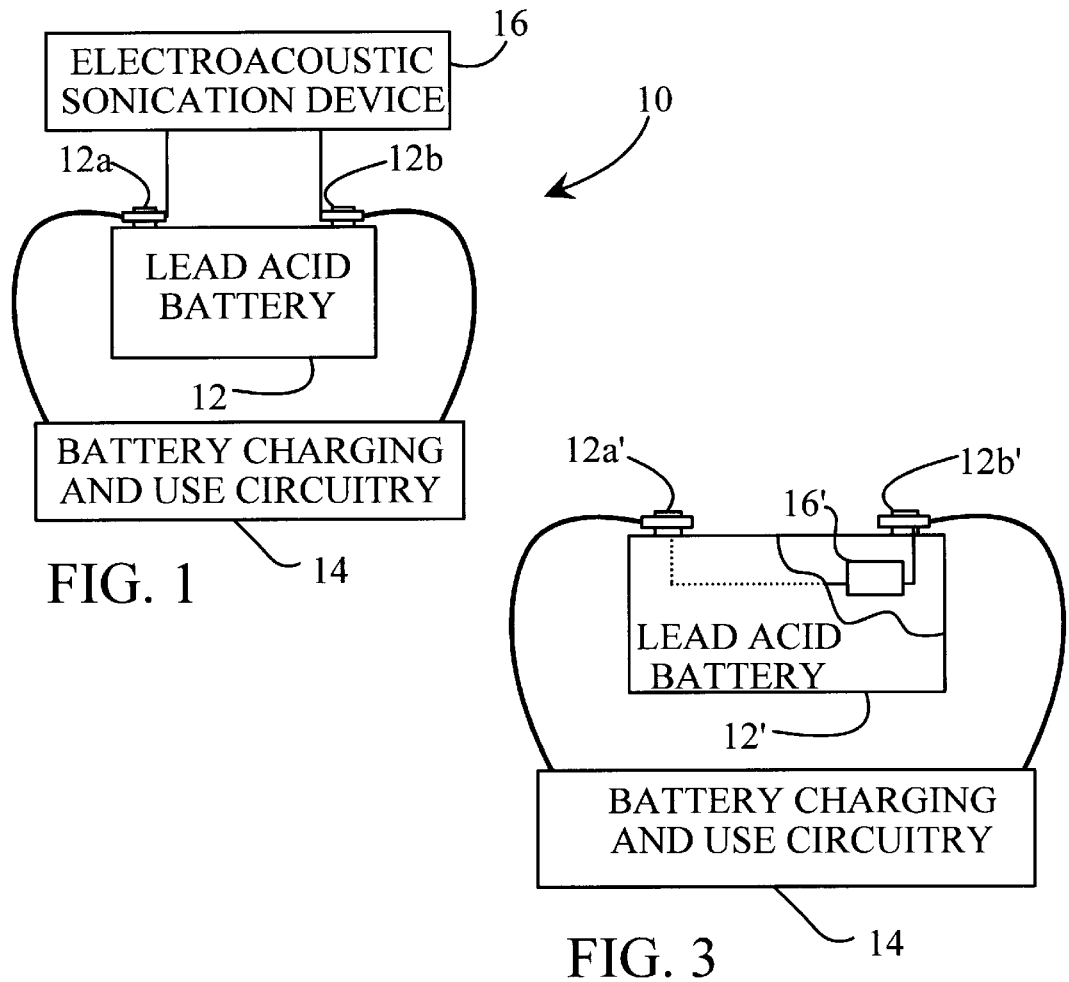
FIG. 1
FIG. 3
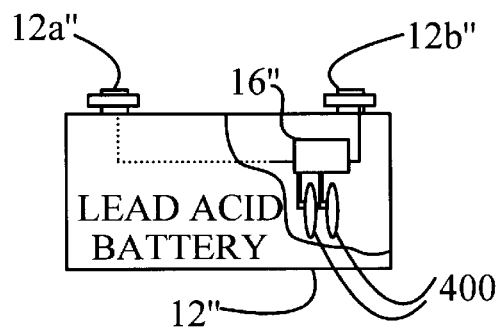
FIG. 4

METHOD AND APPARATUS FOR ELECTROACOUSTIC BATTERY SONICATION

FIELD OF THE INVENTION

The present invention relates generally to battery devices, and particularly to the maintenance and rehabilitation of battery devices.

BACKGROUND OF THE INVENTION

The present invention will be disclosed primarily in the context of lead acid batteries, however it will be understood that the background discussion and following discussion of particular embodiments of the present invention apply to a variety of battery devices beyond the lead acid battery-type.

Batteries undergoing charge and discharge cycles degrade to various degrees depending on the extent of discharge, nature of use, and the nature of the charging process in relation to the battery type. If quality batteries are properly sized and maintained, a battery system, e.g., a battery and associated charging and use circuitry, provides many years of reliable service. All batteries, however, do eventually age and degrade. The subject matter of the present invention extends the useful life of a battery and significantly improves its charging rate and capacity.

In the case of lead acid batteries, for example, each lead acid battery includes a plurality of battery plates with intervening electrically insulated separators therebetween. Each battery plate consists of a lead grid carrying a hardened lead oxide coating of a specific thickness. The battery plates stack alternately, positive next to negative, with a plate separator between each an adjoining pair of positive and negative plates. As a battery goes through multiple charge and discharge, cycles, the oxide coating and the lead grids eventually corrode and thin-out even with normal use. All batteries wear to some degree with each charge and discharge cycle. Excessive battery plate wear occurs, however, whenever a battery is deeply discharged followed by a significant delay in time between the deep discharge and a subsequent recharge. Very thin-plate batteries, such as those found in automobile battery systems, experience severe damage even with a single deep discharge followed by a significant, e.g., 24 hour, delay before charging.

Battery plate separators serve the same purpose in all batteries. The battery plate separator consists of a non-conductive barrier which allows low electrical resistance through the electrolyte, which in turn serves as a protective partition to prevent shorting across adjacent plates. The separator allows free ion flow between the adjacent plates for proper battery chemistry, i.e., to produce an electrical potential across the plates. Battery plate separators, however, do not always function as intended. The battery plate separators can act as a bridge which supports conductive matter causing plate shorting to occur. If plate separators functioned solely as intended, the battery would perform at a maximum potential, with normal plate wear as the main degradation process. Unfortunately, battery plate separators cannot prevent entirely undesirable electrical conduction directly between battery plates. To the extent that electrical conduction does occur between battery plates, battery operation diminishes both in charging rate and energy capacity.

In the case of lead acid batteries, a gradual decrease in battery capacity and charging efficiency occurs over the battery life. This decrease in battery capacity is considered the result of an increased number of minute shorts across the battery plates and through the plate separators.

An accumulation of lead hydrates in lead acid batteries is recognized as a mechanism establishing a limited degree of shorting of battery plates and degrading battery performance. Some battery charging systems provide an overvoltage, i.e., significantly above battery voltage, "equalizing charge" to clean the battery plates. Unfortunately, this method of "cleaning" a battery plate by overcharging causes a degree of damage.

Prior battery rehabilitation procedures and devices focus on the process of sulfation, a normal process occurring during battery discharge wherein sulfates tend to build up in crystalline formation within the battery. When the battery is later charged, however, the sulfates return to solution and again support chemical reactions producing an electrical potential within the battery. These prior battery rehabilitation processes and devices attempt to remove sulfates by application of fast-rise voltage pulses having amplitudes significantly larger than battery voltage. While various parameters of such voltage spike signals have been proposed, these prior procedures and devices by design attempt to establish a high voltage, relative to battery voltage, polarizing charge on the battery plates to dislodge sulfation material from the battery plates.

SUMMARY OF THE INVENTION

The subject matter of the present invention provides a method and apparatus reducing electrical conduction between battery plates and thereby increasing the charging rate and overall capacity of a battery. Removing metallic shorting, e.g., removing lead hydrates in the case of a lead acid battery, from battery plates and plate separators by sonication removes an undesirable path of electrical conduction between battery plates without destructively removing portions of the battery plates. According to one aspect of the present invention, sonication of metallic shorting applies a signal of selected frequency to establish a resonate condition in the battery structure and thereby dislodge metallic shorting, e.g., dislodge lead hydrates in a lead acid battery.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which:

FIG. 1 illustrates a battery system including a battery, a battery charging and use circuit, and an electroacoustic sonication device according to the present invention.

FIG. 3 illustrates a second embodiment of the present invention integrated into a battery.

FIG. 4 illustrates an alternate form of the present invention contemplating use of transducers located within a battery and providing sonication under the present invention.

DETAILED DESCRIPTION OF THE PREFERRED EMBODIMENT

Figure 2:
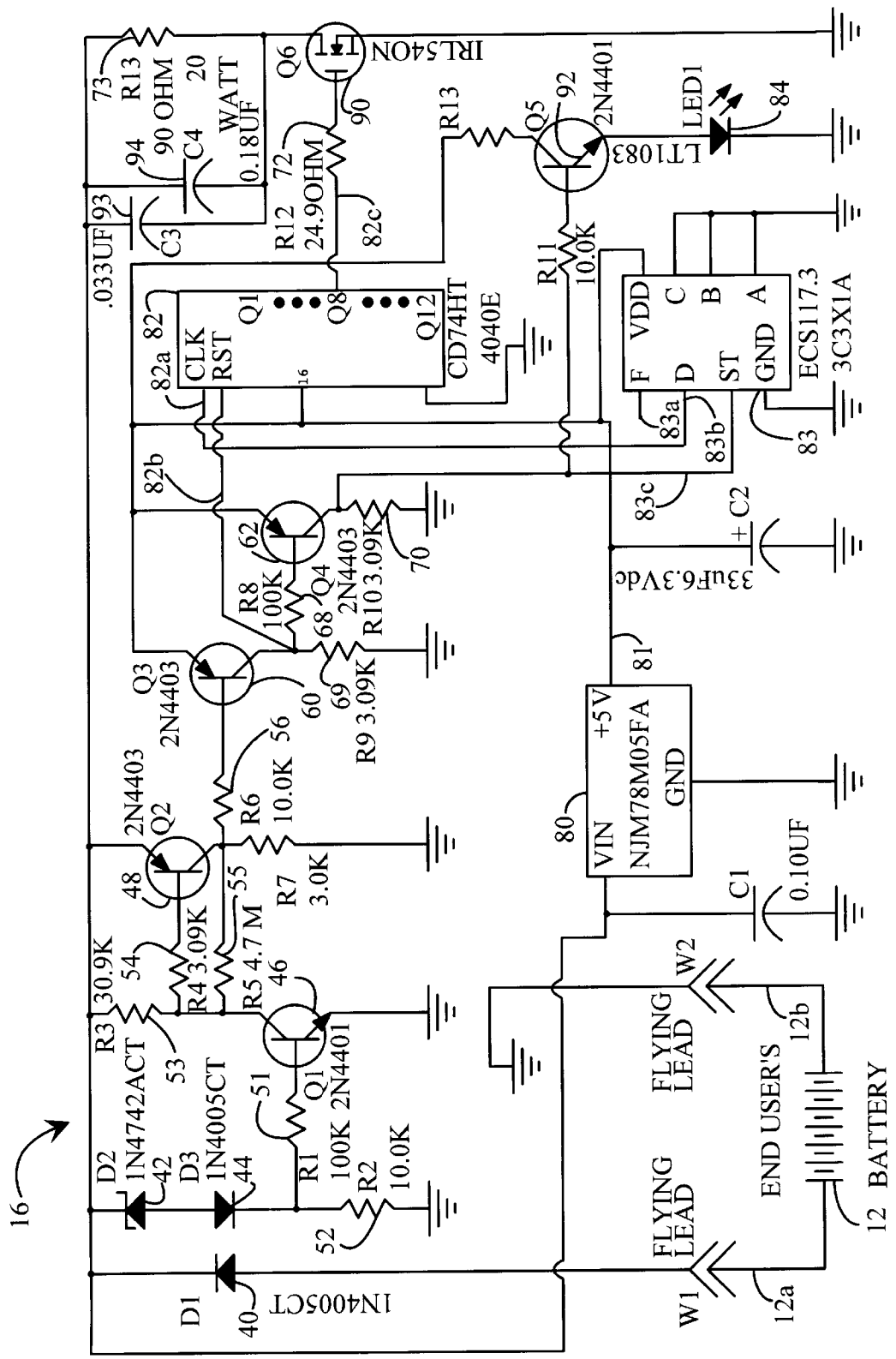
FIG. 2 is a circuit diagram illustrating the electroacoustic sonication device of FIG. 1.

The preferred embodiment of the present invention will be illustrated in the context of lead acid battery usage and rehabilitation. The present invention may be applied, however, to a variety of battery types. Generally, applicants believe the present invention may be applied to any battery employing battery plates and where complete electrical isolation between such plates is desirable and where metallic shorting occurs thereacross as a result of chemical by-products within the battery. The subject matter of the present invention is considered especially useful in any battery system wherein a battery charging cycle may be delayed relative to a preceding discharge cycle.

In the case of lead acid batteries, electrical conduction between battery plates is believed to result from the presence and accumulation of lead hydrate deposits, i.e. metallic shorting caused by the metal bearing conductive components of the lead hydrates. Lead hydrate deposits have been found in increasing amounts on battery separators as a battery ages. This lead hydrate forms, or hydration occurs, whenever lead and or compounds of lead dissolve in water and thereby form a lead hydrate. The free lead, once in hydrate form, becomes chemically locked and cannot again take part in useful battery chemical reactions. While the battery is in its discharged state, the sulfuric acid solution becomes dilute, closer to water than in a charged state. While the battery is in this relatively more "watery" discharged state, free lead molecules combine with the water to form lead hydrate. When the battery is later charged, the inert but electrically conductive hydrate molecules become aligned and polarized. This is believed to create a chain of hydrates bridging the battery plate separators and resulting in minute battery plate shorting, i.e., establishes a path of electrical conduction. Hydrates can be identified as a white chalky residue usually seen at the liquid level line or below, but present throughout the separator surfaces.

Such metallic shorting is believed to occur in a variety of battery types. Whenever the chemistry of the battery produces by-products containing electrically conductive metallic components, metallic shorting occurs and degrades battery performance. In the case of lead acid batteries, metallic shorting is the result of lead hydrates.

Applicants believe that releasing material establishing metallic shorting from the surface of the separators increases battery charging rates and battery capacity. In the case of typical lead acid batteries, the hydrates upon release from the battery plates and plate separators fall harmlessly to the bottom of the battery as an inert material never returning to the plate or separator surfaces during successive charge cycles. The released hydrate residue is heavier than the electrolyte and remains inert, i.e., does not contribute to metallic shorting between the battery plates. The method and apparatus of the present invention provides reduction in such hydration deposits on the separators of a battery by means of sonication.

Generally, the method and apparatus of the first disclosed embodiment of the present invention requires that the positive and negative plates generate the proper frequency via an alternating signal to cause and build the proper acoustic vibration wave to clean by sonication the battery plates and plate separators. Calculation of resonant frequencies for a particular battery structure may be useful and important when maximizing operation of the present invention taking into account battery plate dimensions, speed of sound through lead, speed of sound through the battery electrolyte, the separator material present, and the nature of the battery plate edge supports. Resonant frequency calculations and applicant's experimentation, however, have determined a frequency and frequency range found to be practical for a broad spectrum of lead acid batteries. As a basis for applicant's selection of this useful and practical frequency and frequency range and as a basis for establishing that sonication is the active process responsible for battery rehabilitation under the present invention, the following discussion addresses resonant frequency calculation in a lead acid battery.

Electroacoustic sonication under the present is believed to be dependent on the "boundness" of lead as defined by a relationship between the wavelength of the sound and the dimensions of the bulk materials. The speed of sound in lead is 1,250 meters per second m/s for bound material and 2,400 meters per second (m/s) in unbounded materials. The term "bound" in the present context means that an edge of the material is held fast or clamped, i.e., such as in a common battery plate supported at two points on the bottom of the plate and supported at the top of the plate by a connection to the battery terminal post. About 90% of a lead acid battery plate is considered to be "free-edged." For a free-edged plate, there is believed to be no analytical solution when solving for the exact resonant frequency. Therefore, it may not be possible to calculate a perfect frequency for the resonance of a lead acid battery, however, the following calculation is instructive:

$$V_{lead} = (\text{FREQUENCY}) \cdot (\text{WAVELENGTH})$$

For UNBOUNDED LEAD, $$V_{lead} = 2,400 \text{ m/s} = (F) \cdot (0.01 \text{ m})$$

$$F = 240 \text{ kilohertz}$$

For BOUNDED LEAD, $$V_{lead} = 1,200 \text{ m/s} = (F) \cdot (0.01 \text{ m})$$

$$F = 120 \text{ kilohertz}$$

Thus, an appropriate resonant frequency for sonication in a lead acid battery may be approximated under these calculations and, in general, a 200–300 kilohertz frequency is productive. A lower frequency may work to some degree, but will be of lesser effect. Higher frequencies, however, produce vibration of smaller portions of a given body. The nature and shape of the of the battery elements to be vibrated drives frequency selection to the range suggested herein. A typical lead acid battery grid consists of squares, or a similar shape, of approximately 0.01 m. This characteristic of typical lead acid batteries provided a basis for selecting a 0.01 m wavelength in the above calculations. Other battery configurations would likely exhibit different resonant characteristics and would possibly require different sonication signal frequencies.

If the battery plates were bound lead bars, as opposed to plates for example, a frequency as low as 6.25 kilohertz may be effective to establish a resonant condition. To resonate an unbound bar-shaped element, however, the first, or half, wave need be approximately 12 kilohertz. For conventional lead acid batteries, however, the best results for cleaning by sonication have been found to be at frequencies on the order of 240 kilohertz.

The above calculations are believed to establish the productive effect of a sonication process as opposed to prior battery rehabilitation methods directed to producing a high voltage, i.e., high relative to battery voltage, electrical charge on a battery plate. Sonication signal frequencies selected under the present invention, however, are based on resonate characteristics of the particular battery receiving sonication. In general, and for typical lead acid batteries having grid mesh plates presenting 0.01 m grid elements, a 240 kilohertz sonication signal has been found to be effective in practice of the present invention and is considered evidence of the productive nature of sonication as a method of battery rehabilitation.

Thus, a preferred embodiment of the present invention operates at a frequency of 240 kilohertz because this frequency has been found acceptable through experimentation across a variety of lead acid battery configurations. Generally, the device of the present invention attaches to the positive and negative leads of a lead acid battery and uses electrical energy thereat to establish a resonant frequency within the battery to remove metallic shorting, e.g., lead hydrates, from the battery plates and the plate separators. The amplitude of the sonication signal can be applied substantially at the battery voltage.

Power requirements for the electroacoustic sonication device of the present invention as applied to a typical 12 VDC lead acid battery are approximately 0.1 ampere (A) at 12 VDC and may be provided by multiplexing the power over the output signal as described more fully hereafter. The device reacts to a supply voltage slightly above nominal battery voltage, e.g., above 12.6 volts DC, since voltages above this voltage are considered either residual voltages or, most preferably, charging voltages. Maximum effectiveness, however, occurs during a charge cycle. Because the chemical environment of a battery undergoing discharge facilitates formation of hydrate structures, applicants believe that the chemical environment of a battery undergoing charge best facilitates productive sonication under the present invention. Furthermore, a charging process is believed to polarize and organize metallic material, e.g., organize lead hydrates in the case of a lead acid battery, into an electrically conductive path. As may be appreciated, an electrically conductive path between plates during charging degrades charging rate and overall battery storage capacity and performance.

The voltage of a 12 volt DC battery ranges from 12 volts to 12.6 volts absent a charge voltage. Whenever a charge voltage is present, the battery voltage ranges from 12.7 volts DC to 14.2 volts DC. In essence, whenever a 12 volt battery reaches 14.2 volts during charging, it has reached full charge and, following a rest period, falls to its normal charge of 12.6 volts. The electrical circuitry described hereafter takes into account these voltage levels and conditions of a lead acid battery to operate at voltage levels corresponding to a charging cycle or to a fully charged battery condition. In this manner, the device of the present invention remains attached to the battery terminals but does not discharge a battery below its full charge condition.

FIG. 1 illustrates a battery system 10 including a lead acid battery 12, battery charging and use circuitry 14, and an electroacoustic sonication device 16 according to a preferred embodiment of the present invention. The particular electroacoustic sonication device 16 described and illustrated herein is designed for use in connection with a 12 VDC lead acid battery. It will be understood however, the subject matter of the present invention applies to other lead acid battery voltages, and to other battery-types beyond lead acid batteries.

In operation, battery charging and use circuitry 14 takes energy from battery 12 as needed and delivers energy to battery 12 when necessary. For example, battery charging and use circuitry 14 may represent the electrical system of an automobile wherein battery 12 energy is taken while the automobile starter turns an engine. Once the engine starts, however, battery charging and use circuitry 14 delivers energy, e.g., via an alternator, to lead acid battery 12 in a charging function. Alternate battery systems might include back up systems, e.g., in a hospital or computer system, standing ready to support hospital or computer operation during a power failure. Such battery systems tend to undergo deep discharge without an immediate opportunity for recharge. Thus, battery 12 and circuitry 14 interact alternately through charging and discharging cycles in normal use. The electroacoustic sonication device 16 monitors the voltage level present across the positive and negative terminals, individually terminals 12a and 12b respectively, of battery 12 and injects an appropriate harmonic signal into battery 12 as described hereafter. Device 16 is active only at certain battery 12 voltages, e.g., fully charged or during charging, to avoid excessive discharge of battery 12.

FIG. 2 illustrates a circuit diagram for the electroacoustic sonication device 16 as applied to battery 12 in FIG. 1. In FIG. 2, battery 12 appears as coupled to device 16 with terminal 12b providing a ground reference and terminal 12a providing a 12 volt positive voltage reference. Battery 12 or circuitry 14 (FIG. 1) thereby provide power to device 16. Battery 12 couples to device 16 to receive a rich harmonic feed-back signal establishing sonication within battery 12.

Diode 40 (D1) provides reverse polarity protection in the event that a user incorrectly connects device 16 to battery 12. Diodes 42 (D2) and 44 (D3) along with transistors 46 (Q1) and 48 (Q2) form a voltage sensing switch activating at 12.75 volts and deactivating at 12.6 volts. Diode 42 (D2) is a 12 volt zener diode. Diodes 42 and 44 establish the trip point. Interaction between diodes 42 and 44 cause the actual trip condition. Transistors 46 (Q1) and 48 (Q2), along with resistors 51, 52, 53, 54, and 55 (R1–R5) form a digital amplifier. When the voltage at diode 42 (D2) reaches its break over point and begins conduction, the voltage at resistor 51 (R1) rises. As this voltage passes 0.6 volts, transistor 46 (Q1) reaches saturation and obtains most of its collector current from the base of transistor 48 (Q2) through resistor 54 (R4). This condition drives transistor 48 (Q2) into saturation providing a high digital output at resistor 56 (R6). As the voltage at resistor 51 falls below 0.6 volts, transistor 46 (Q1) cuts-off and this in turn cuts-off transistor 48 (Q2) through resistors 53 (R3) and 54 (R4). This produces a low digital output at resistor 56 (R6). Resistor 55 (R5) provides a small degree of hysteresis for this voltage sensing switch to improve its speed.

Transistors 60 (Q3) and 62 (Q4) along with resistor 56 (R6) and resistors 68, 69, and 70 (R8–R10) form a digital inversion and voltage conditioning network. When resistor 56 is at its digital low state, i.e., 0 volts, transistor 60 (Q3) switches fully on. This causes resistor 68 (R8) to be high and cut off transistor 62 (Q4) thereby providing a digital low state at its output taken at resistor 70 (R10). As transistor 48 (Q2) changes state, the digital value of the outputs of transistors 60 (Q3) and 62 (Q4) exchange values, i.e., transistor 62 is high when transistor 60 is low and transistor 60 is high when transistor 62 is low. This voltage conditioning function occurs due to the emitter connection of transistors 60 and 62 being applied to the output of integrated circuit 80 (U1). Integrated circuit 80, a voltage regulator, provides a five volt supply voltage 81.

The digital outputs of transistors 60 (Q3) and 62 (Q4) control the operation of integrated circuits 82 (U2) and 83 (U3) and LED 84 (LED1). When battery 12 voltage is above 12.75 volts, integrated circuits 82 (U2) and 83 (U3) activate. Integrated circuit 83 (U3) is a dual output crystal controlled oscillator with an original frequency of 17.734476 MHz available at its F pin 83a. The D pin 83b provides as output the frequency of a programmed dividing ratio. Pins A, B, and C of integrated circuit 83 program the dividing ratio of the original frequency, and are tied to ground potential. The ST pin 83c controls the oscillator. A high logic level at pin 83c allows oscillation, and a low logic level stops oscillation.

Under this configuration, i.e., with pins A, B, and C tied to ground potential, the frequency provided at the D pin 83b is half that of the original frequency, i.e., pin 83b carries a 8.867238 MHz frequency. This output applies to the clock input 82a (U2) of integrated circuit 82 (U2). Integrated circuit 82 is a 12-bit binary counter. Integrated circuit 82 (U2) requires for operation a low logic signal on its reset pin 82b. Integrated circuit 82 operates as a frequency divider, the amount of division being controlled by output pin selection. In this case pin 82c (Q8) is selected as an output pin of integrated circuit 82 (U2) and applied, via resistor 72 (R12) to the gate of transistor 90 (Q6). Thus, the signal taken at pin 82c of integrated circuit 82 (U2) executes a frequency divided-by-two function eight times, resulting in an output of 34,638 Hz. This output drives the final output stage of device 16 by application to the gate of transistor 90. The output stage of device 16 includes resistors 72 (R12) and 73, capacitors 93 (C3) and 94 (C4) and transistor 90 (Q6). Resistor 72 (R12) limits the effect of any parasitic oscillations on the gate of transistor 90 (Q6). Transistor 90 (Q6) is a logic level power MOSFET capable of switching 28 amps. at 100 volts. This produces rapid switching times which, when coupled with the RC network formed by capacitors 93 and 94 and resistor 73, creates a rich harmonic signal fed back into battery 12. Transistor 92 (Q5) provides a switching device for LED 84 (LED1) indicating that the oscillator is functioning.

Odd order harmonics produced at the final output stage of device 16 are believed to create productive electroacoustic sonication effect within battery 12 considered responsible for removing lead hydrates off the plates and plate separators of battery 12 and thereby rehabilitating battery 12 against undesirable electrical conduction between adjacent battery plates.

Applicant's experimentation shows that use of device 16 produces an agitating action within the battery 12 and reduces or removes the accumulation of lead hydrate. After battery 12 has received sonication under the present invention, a fine white powdery substance can be seen accumulating at the bottom of battery 12. Furthermore, and importantly, the charge rate for battery 12 increases following sonication under the present invention. The accumulation of the hydrate powder is most evident when applied to a good used battery. As a result of sonication under the present invention, battery 12 plates and plate separators are cleansed and the battery possesses increased efficiency in its chemical reaction evidenced by a shorter charging time. The battery also typically reaches a higher state of charge, thereby increasing overall storage capacity. Finally, because there is no electrical shorting while battery 12 is being charged, there is less heat generated, thereby saving battery plate integrity.

FIG. 3 illustrates use of an alternate electroacoustic sonication device 16' integral to, i.e., placed within, a battery 12'. The circuitry of device 16' is identical to device 16 described herein, but is packaged to withstand the internal environment of battery 12'. Because device 16' responds to and activates during a charging cycle of battery 12', device 16' may be incorporated into battery 12' at manufacture and remain electrically coupled to battery terminals 12a' and 12b' without discharging battery 12'. Also, because device 16' is applied to a specific battery, i.e., battery 12', the particular sonication signal frequency selected may be optimized for use relative to the particular resonate characteristics of that specific battery, i.e., the particular resonate characteristics of battery 12'. As may be appreciated, manufacture of a given battery may incorporate particular structure to establish desirable or predictable resonate characteristics in relation to sonication under the present invention.

FIG. 4 illustrates another embodiment of the present invention employing sound transducers 400 placed within a battery 12" and responsive to electroacoustic sonication device 16". Device 16" electrically couples to battery terminals 12a" and 12b" and operates substantially as does circuitry 16 previously described, but produces a resonate condition in battery 12" via sound transducers 400. In effect, the previous embodiments of device 16 used the battery plates as transducers.

Thus, the method and apparatus of the present invention provides removal of metallic shorting, e.g., lead hydrates, from lead battery plates and plate separators. By removal of such metallic shorting, undesirable electrical conduction between battery plates is reduced or eliminated. The device of the present invention may be attached to a battery and operate under power available at the battery terminals without interfering with battery operation, discharging, or charging cycles.

It will be appreciated that the present invention is not restricted to the particular embodiment that has been described and illustrated, and that variations may be made therein without departing from the scope of the invention as found in the appended claims and equivalents thereof.

What is claimed is:

1. A method of rehabilitating a discharged battery, said battery comprising at least two battery plates separated by an electrically non-conductive separator, said method comprising the steps:

applying a sonication signal to decrease metallic shorting between said at least two battery plates, said sonication signal being an electrical signal applied relative to said battery plates and of frequency selected to establish a resonant condition within said battery.

2. A method according to claim 1 wherein said battery is a lead acid battery and said metal shorting is decreased by said sonication signal removing lead hydrates bridging adjoining battery plates.

3. A method according to claim 1 comprising further the step of charging said battery concurrently with said removing step.

4. A method according to claim 3 wherein said device activates during said charging of said battery.

5. A method according to claim 1 wherein said sonication is by application of electrical signal to first and second terminals of said battery.

6. An apparatus for battery rehabilitation, said battery having given resonate characteristics, said battery including at least two adjacent battery plates, a separator element, and first and second battery terminals, said apparatus comprising:

frequency generating circuitry, said frequency generating circuitry providing a sonication signal operating at a frequency selected to produce sonication within said battery, said frequency being selected as a function of said given resonate characteristics of said battery; and coupling means applying said sonication signal to said battery to produce said sonication within said battery.

7. An apparatus according to claim 6 wherein said coupling means comprises conductors applying said sonication signal to said first and second battery terminals.

8. An apparatus according to claim 7 wherein said frequency generating circuitry detects a charging voltage at said first and second battery terminals and applies said sonication signal only in response to said charging voltage.

9. An apparatus according to claim 6 wherein said circuit senses a charging state for said battery and applies said sonication signal only during said charging state.

10. A method of battery rehabilitation relative to a given battery, said given battery having resonate characteristics, the method comprising the steps:

charging said battery;

applying a sonication signal to said battery concurrent with said charging step, said sonication signal operating at a frequency selected as a function of said resonant characteristics of said battery and to produce sonication within said battery.

* * * * *